June 7, 1960
T. J. TUREK
2,939,553
AUTOMATICALLY ADJUSTED ACTUATOR
Filed June 3, 1957
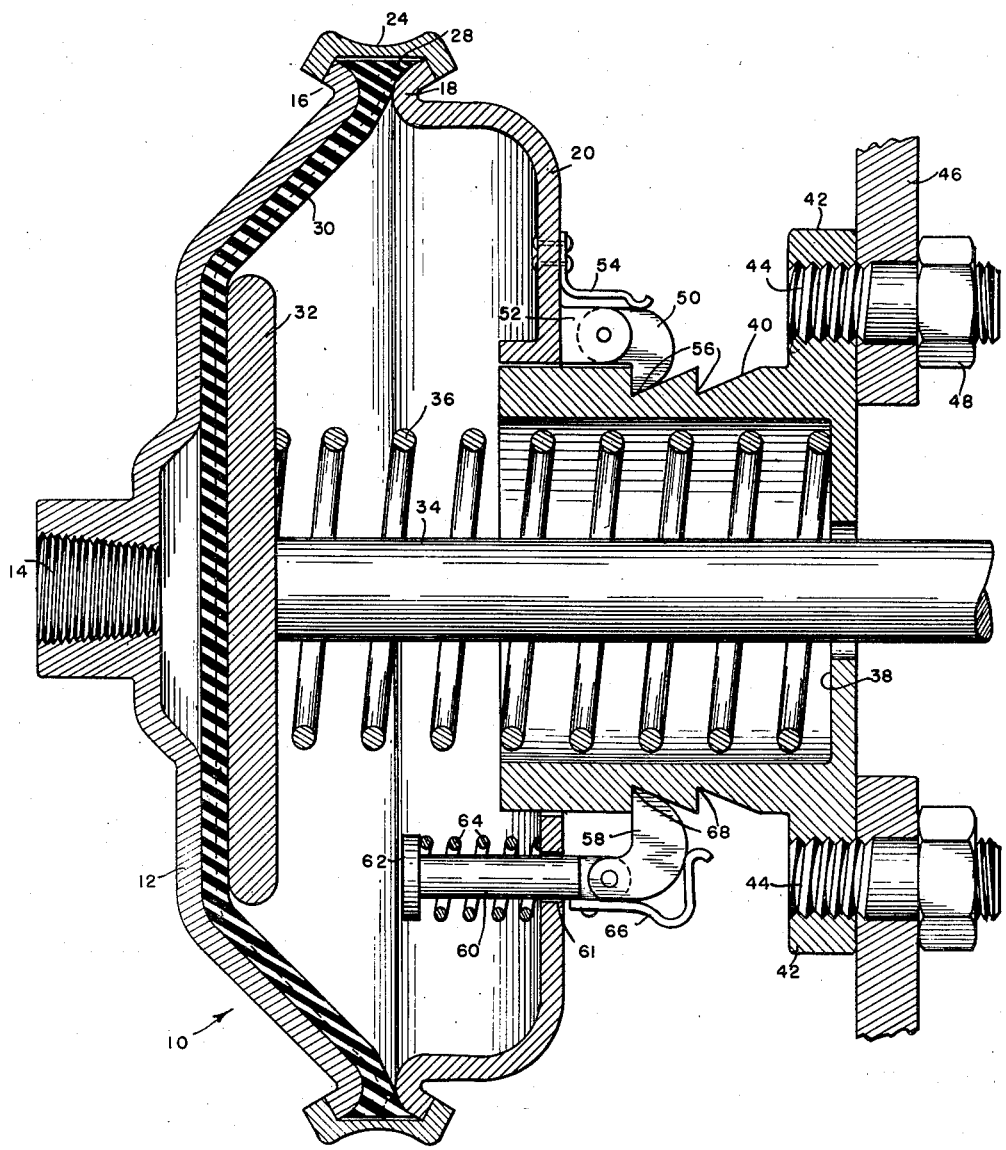
INVENTOR
THOMAS J. TUREK
BY *Scrivener & Parker*
ATTORNEY 2,939,553
Patented June 7, 1960

2,939,553

AUTOMATICALLY ADJUSTED ACTUATOR

Thomas J. Turek, Elyria, Ohio, assignor to Bendix-Westinghouse Automotive Air Brake Company, Elyria, Ohio, a corporation of Delaware Filed June 3, 1957, Ser. No. 663,198

8 Claims. (Cl. 188—196)

This invention relates to fluid pressure operated power actuators and more particularly to a power actuator provided with means for automatically advancing the stroke or slack of the actuator as the actuated member, such as a brake shoe lining for example, becomes worn.

Fluid pressure actuators, such as those used for braking purposes, run out of stroke as the brake shoe linings wear and to restore the required stroke it is necessary to readjust the slack adjuster, or if these are not provided, to lengthen the actuator push-rod.

One of the principal objects of the present invention is to provide a novel actuator which automatically advances its initial stroke position, at intervals, to compensate for a predetermined amount of wear of the actuated member.

Another object of the invention is the provision of an automatically adjusting actuator wherein the adjustment is achieved through the bodily movement of the entire power actuator to an advanced position in the direction of the member acted upon when the latter has worn a predetermined amount.

Other objects and their attendant advantages will become apparent as the following detailed description is read in conjunction with the accompanying drawing wherein the single figure is a sectional view of a power actuator constructed in accordance with the invention.

For purposes of illustration the power unit of the invention will be described as it would be employed for actuating brakes though it will become apparent that the invention is not limited to such use.

Referring now to the drawing, 10 designates the fluid power actuator of the invention which comprises a dished pressure plate 12 having a central inlet port 14 for connection to a pressure source (not shown) which may be controlled by any suitable valve, such as a brake valve. The plate 12 may be provided with an annular flange 16 which opposes a similar flange 18 on a non-pressure plate 20, and clamped between the flanges 16, 18, as by means of a clamping ring 24 having a substantially U-shape cross-section for engaging the outer surfaces of the flanges 16, 18, is the peripheral edge 28 of a flexible diaphragm 30. Other suitable and well-known means could be utilized for clamping the diaphragm between the pressure and non-pressure plates to divide the interior of the actuator 10 into pressure and atmospheric sides in the usual manner, and abutting the atmospheric side of the diaphragm is a push-plate 32 having concentrically and integrally attached thereto a push-rod 34 which is connected at its opposite end to an actuating lever (not shown) which for purposes of illustration may be deemed to comprise the usual brake lever. The diaphragm 30, push-rod 34 and push-plate 32 are retained in the normal de-energized position of the drawing by means of a compression spring 36 which acts at one end against the push-plate 32 and at its opposite end against the inner bottom face 38 of a cylindrical member 40 having a flange 42 suitably tapped to receive studs 44 which may extend through registering holes in a relatively stationary support frame 46 to receive nuts 48 for supporting the actuator of the invention in its position of use. The non-pressure plate 20 of the actuator is provided with an opening sufficiently large to slidably receive the open end of the cylindrical member 40 and the entire motor assemblage 10 of the invention is connected to the cylindrical member 40 through the medium of a plurality of latches 50 which are pivotally attached to brackets 52 integral with the outer surface of the plate 20. Each latch 50 (only one is shown though it should be understood that several may be provided) is urged by a spring 54 into engagement with one of a plurality of notches 56 spaced longitudinally along the outer surface of the cylindrical member 40. Initially the latches 50 would engage the outermost notches 56 as shown but would engage the inner notches successively in a manner that will become apparent as the actuated member, such as brake shoes for example, becomes worn and the entire actuator 10 moves inwardly to the right in the drawing.

In addition to the latches 50, which may be referred to as load-carrying or holding latches, there are provided one or more adjusting latches 58, each of which is pivotally carried on the end of a plunger 60 projecting through an aperture 61 in the non-pressure plate 20 as shown. The plunger 60 is provided with a head portion 62 and engaging the under side of the head portion 62 is one end of compression spring 64 whose opposite end engages the inner surface of the pressure plate 20. For purposes that will become apparent, the combined initial loads of all the springs 64 associated with as many plungers 60 as may be utilized must exceed the final initial load of the diaphragm return spring 36. The projecting end of each of the plungers 60 carries a leaf type spring 66 which bears on the latch 58 and urges it into one notch 68 of a series of notches on the exterior of the cylindrical member 40 similar to the series of notches 56 for the holding latches 50.

In operation, the actuator of the invention adjusts itself automatically to compensate for the wear of the actuated member and this is accomplished through the action of the push-plate 32 being moved into abutment with the plunger 60 when the actuator is energized. The plunger is designed to have a length such that during early operation of the actuator, before the actuated member, such as a brake, has become worn, the plunger is moved only slightly by the push-plate 32 in the direction of movement of the push-rod 34. However, as the brakes become worn the diaphragm, push-rod and plate move increasingly further to the right until the plunger 60 is moved sufficiently far in the direction of movement of the push-rod that the adjusting latch 58 is extended and drops into the next succeeding notch 68. Thereafter, when the pressure is released from the pressure side of the diaphragm, the latter with the push-rod and plate are moved to the left by the return spring 36 away from the plungers 60 so that the springs 64 thereof commence to expand creating a force on the inner face of the non-pressure plate 20 in the direction of the actuated member. As the diaphragm and push-plate continue to move to the left the combined force of all the plunger springs 64 in the direction of the actuated member exceeds the force of the return spring in the opposite direction. Thus the entire actuator housing moves to the right and this movement continues until the springs 64 are expanded to their normal condition at which point the holding latches 50 move up over and drop into the next notch 56 corresponding to the next notch 68 already occupied by the adjusting latch 58.

When the actuator has been advanced as above described, the diaphragm push-plate and rod move relatively the same distance to the right as they did when the actuator was in its initial position before the actuated member became worn. Now in the advanced position, the push-plate operates on the plunger exactly as it did before and as the actuated member continues to wear the plunger is eventually pushed sufficiently far for its latch 58 to engage the next notch and thus advance the actuator exactly as described above. Only two notches are shown in each set in the drawing, but it should be understood that as many notches can be provided as desired so that the actuator can accommodate itself to the maximum extent that the actuated member may become worn and still operate as intended. The notches have been shown and described as comprising separate series of notches. However, it will be apparent that each notch could comprise a continuous annular groove machined on the exterior face of the member 40 with each groove serving both types of latches. Where, in the claims, separate series of notches are recited for the separate types of latches, this is intended to include the concept of continuous annular grooves. It is preferable that the adjusting latch carry none of the reaction load when air pressure is applied and that this load be borne entirely by the holding latches 50. This can be assured by suitable selection of plunger size or by different sized notches for the separate types of latches. For example, the notches 56 could be smaller than the notches 68 and so positioned relative to the latter that the adjusting latches 58 are not under load when air pressure is supplied to the actuator.

When the actuated member is restored to its original condition as by replacement of a brake lining, the entire actuator 10 may be moved manually to the left in the drawings by merely retracting the latches against their springs and then moving the actuator until the latches register with the outermost notches whereupon the actuator is in condition to operate as above set forth.

From the above description it should be apparent that the automatic adjusting actuator of the invention is susceptible of a wide variety of uses and particularly to the automatic compensation for the slack in brakes as these become worn through use. The present invention eliminates the necessity of lengthening the push-rod either manually or through some complex automatic mechanism. It will of course be apparent that the actuator of the invention is susceptible of various modifications and changes in form without, however, departing from the scope and spirit of the appended claims.

What is claimed is:

1. A fluid pressure actuator comprising a housing having a pressure responsive element therein and defining with said housing a pressure chamber and an atmospheric chamber, a spring in said atmospheric chamber tending to move said element away from said atmospheric chamber, a stationary member projecting into said atmospheric chamber and providing sliding support for said housing, a first series of longitudinally aligned notches on said member, holding latch means positioned on the exterior of said housing to engage a notch of said series to connect said housing to said member, a second series of longitudinally aligned notches on said member, a plunger extending through a wall of said housing into said atmospheric chamber, a latch on the outer end of said plunger for engagement with a notch of said second series, a second spring tending to move said plunger and said housing in opposite directions, the inner end of said plunger extending into the path of movement of said pressure responsive element to be moved thereby against the force of said second spring upon greater than normal movement of said element to advance said latch on said plunger to the next succeeding notch of the second series, the return of said last named spring to its initial condition, upon release of fluid pressure, acting on said housing to advance it bodily along said stationary member until said holding latch engages its next succeeding notch of the second series.

2. The fluid pressure actuator of claim 1 wherein the initial strength of said second spring exceeds the initial strength of said first spring regardless of the adjusted position of said actuator on said stationary member.

3. In a fluid pressure actuator comprising a housing, a pressure responsive element defining with said housing a pressure chamber and an atmospheric chamber, and a return-spring tending to move said element towards a normally de-energized position, means for adjusting the slack of said actuator comprising a stationary member providing a sliding support for said housing, a first and second series of longitudinally aligned notches on said stationary member, holding latch means connected to said housing and engageable with said first series of notches, an adjusting latch connected to said housing and engageable with said second series of notches, means for extending said adjusting latch to move it from a first notch to a second notch of the second series upon greater than normal movement of said pressure responsive element, and spring means cooperating with said adjusting latch and said housing, said spring means being flexed upon extension of said adjusting latch and acting to move said housing in the direction of movement of said adjusting latch upon return of said pressure responsive element by the return spring to its normal de-energized position.

4. In a fluid pressure actuator comprising a housing, a pressure responsive element defining with said housing a pressure chamber and an atmospheric chamber, and a return-spring tending to move said element towards a normally de-energized position, means for adjusting the slack of said actuator comprising a stationary member providing a sliding support for said housing, a series of longitudinally aligned notches on said stationary member, an adjusting latch connected to said housing and engageable with said series of notches, means for extending said latch to move it from a first notch to a second notch upon greater than normal movement of said pressure responsive element, and spring means cooperating with said latch and said housing, said spring means being flexed upon extension of said latch and acting to move said housing in the direction of movement of said latch upon return of said pressure responsive element by the return spring to its normal de-energized position.

5. In a fluid pressure actuator comprising a housing, a pressure responsive element defining with said housing a pressure chamber and an atmospheric chamber, and a return-spring tending to move said element towards a normally de-energized position, means for adjusting the slack of said actuator comprising a stationary member providing a sliding support for said housing, a first and second series of longitudinally aligned notches on said stationary member, holding latch means connected to said housing and engageable with said first series of notches, an extensible plunger connected to said housing, a latch on said plunger engageable with said second series of notches, means for extending said plunger to move said latch from a first notch to a second notch of the second series upon greater than normal movement of said pressure responsive element, and spring means tending to move said housing in the direction of movement of said latch upon extension of said plunger, said spring means acting on said housing to move it bodily in the direction of movement of said latch upon return of said pressure responsive element by the return spring to its normal de-energized position, said holding latch engaging the next succeeding notch in the first series upon completion of the movement of said housing in the direction of movement of the latch.

6. In combination with a relatively stationary support, a fluid pressure actuator comprising a housing slideably mounted on said support, a pressure responsive element defining with said housing a pressure chamber and an atmospheric chamber, and a return spring in said atmospheric chamber disposed between said stationary support and said element and tending to move said element to a normal de-energized position, means for adjusting the slack of said actuator comprising a first and second series of longitudinally aligned notches on said support, holding latch means connected to said housing and engageable with said first series of notches, an adjusting latch connected to said housing and engageable with said second series of notches, means for extending said adjusting latch to move it from a first notch to a second notch of said second series upon greater than normal movement of said pressure responsive element, and spring means having greater strength than said return spring cooperating with said adjusting latch and said housing, said spring means being flexed upon extension of said adjusting latch and acting to move said housing in the direction of movement of said adjusting latch against the force of said return spring when the latter acts on said pressure responsive element to return it to its normal de-energized position, said holding latch engaging the next succeeding notch upon completion of movement of said housing in the direction of the extended latch.

7. A fluid pressure brake actuator comprising a housing having a pressure responsive element therein movable in one direction for applying a brake, a stationary support for slideably supporting said housing, and means for moving said housing on said support for adjusting the slack of the actuator, comprising a first and a second series of aligned notches on said support, adjusting latch means carried by the housing and movable by said element upon greater than normal movement thereof in said one direction for engaging a notch of said first series for advancing said housing on said support to an adjusted position, and holding latch means for engaging a notch of said second series for maintaining said housing in its adjusted position.

8. The brake actuator of claim 7 wherein the adjusting latch means includes a plunger extending into the housing together with spring means positioned between the plunger and housing.

References Cited in the file of this patent
UNITED STATES PATENTS
2,554,064    Shields _____ May 22, 1951